(12) United States Patent
Blach et al.

(10) Patent No.: US 6,227,693 B1
(45) Date of Patent: May 8, 2001

(54) MULTI-SHAFT SCREW MACHINE WITH STOP ASSEMBLIES FOR INDIVIDUALLY SETTING THE POSITIONS OF THE SCREW ELEMENTS

(76) Inventors: Josef A. Blach; Michael Blach; Markus Blach, all of Hoher Steg 10, D-74348 Lauffen (DE)

( * ) Notice: Subject to any disclaimer, the term of this patent is extended or adjusted under 35 U.S.C. 154(b) by 0 days.

(21) Appl. No.: 09/392,849

(22) Filed: Sep. 9, 1999

(30) Foreign Application Priority Data

Oct. 13, 1998 (DE) ............................................. 198 47 104

(51) Int. Cl.$^7$ ................. B29B 7/48; B29B 7/58
(52) U.S. Cl. ................................. 366/85; 366/79
(58) Field of Search .................. 366/81–85, 89, 366/100, 297, 301, 318, 331, 79; 403/343; 425/192 R, 204, 208, 209

(56) References Cited

U.S. PATENT DOCUMENTS 4,527,899 * 7/1985 Blach et al. .
5,476,319 * 12/1995 Blach .

* cited by examiner

*Primary Examiner*—Charles E. Cooley
(74) *Attorney, Agent, or Firm*—Flynn, Thiel, Boutell & Tanis, P.C.

(57) ABSTRACT

In order to position the screw elements (6) axially precisely on the shafts (1) of a multi-shaft screw-type machine, a split stop ring (8) against which the screw elements (6) are prestressed is provided in a first ring groove (9) of the shaft (1). Spaced from the first ring groove (9), a second ring groove (11) with a screw thread (14) is provided. A straining ring (18) to be prestressed against the stop ring (8) and connected with the shaft (1) so as to rotate in unison is in screw connection with the screw thread (14).

5 Claims, 3 Drawing Sheets

MULTI-SHAFT SCREW MACHINE WITH STOP ASSEMBLIES FOR INDIVIDUALLY SETTING THE POSITIONS OF THE SCREW ELEMENTS

FIELD OF THE INVENTION

This invention relates to a multi-shaft screw-type machine.

BACKGROUND OF THE INVENTION

To permit the axially tandem-mounted screw elements to intermesh tightly on the axis-parallel shafts of such a machine, they must be positioned reliably on the shafts in the axial direction with the highest precision. For this purpose the screw elements are disposed in axially displaceable fashion on the shaft, e.g. with a splining, and connected with the shaft so as to rotate in unison. The screw elements are tightly prestressed axially on the shaft, with the shaft tip, which is accordingly formed as a screw bolt, screwed into an axial threaded bore in the shaft end.

The stop can be formed, for example, by a collar created by turning off the shaft on the lathe. Since such a collar involves enormous production effort, it is also known to provide the shaft with a ring groove receiving a split stop ring. However, such a stop ring in a ring groove of the shaft does not allow the desired precision to be attained in view of the high axial loads acting on the screw shafts, in particular, the high axial pressure.

SUMMARY OF THE INVENTION

The problem solved by this invention is to ensure in simple fashion a lasting positioning of the screw elements in the axial direction with the highest precision in all operating states of the machine.

Specifically, this invention is directed to a screw-type machine with plural shaft assemblies. Each shaft assembly includes an elongated shaft. One or more screw elements are fitted to the shaft. The screw elements rotate in unison with the shaft and are able to move along the length of the shaft. A stop assembly is fitted to one end of the shaft. The stop assembly is positioned to abut one of the screw elements to prevent movement of the screw elements along the shaft. The stop assembly includes a stop ring that is seated in a groove formed in the shaft. Each shaft assembly also includes a straining ring that is fitted over the shaft. The straining ring engages a screw thread formed in the shaft. The straining ring is positioned to abut the stop ring. The abutment of the straining ring against the stop ring prevents displacement of the stop ring which could result in displacement of the screw elements.

BRIEF DESCRIPTION OF THE DRAWINGS

In the following an embodiment of the invention will be explained in more detail with reference to the enclosed drawing, in which.

DETAILED DESCRIPTION

Figure 1:
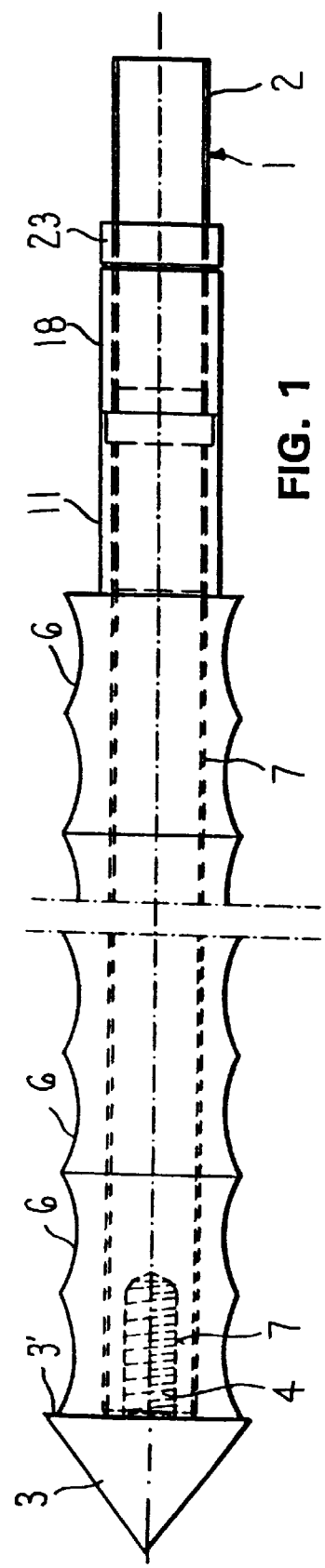
FIG. 1 shows a view of a screw shaft.

According to FIG. 1 a coupling (not shown) for driving shaft 1 is fastened to continuously toothed shaft 1, which is wrought for example, at the right-hand end on splining 2. Fastened to the other, left-hand end of shaft 1, i.e. on the discharge side of the machine, is shaft tip 3 which is accordingly formed as screw bolt 4 screwed into axial threaded bore 5 in the shaft end. Disposed axially in tandem on shaft 1 are a plurality of screw elements 6 which are axially displaceable on shaft 1 and connected with shaft 1 so as to rotate in unison. Shaft 1 is provided for this purpose with splining 7 onto which screw elements 6 are slipped.

Provided for axial positioning of screw elements 6 are, firstly, shaft tip 3 which acts with its face 3' on the face of adjacent screw element 6 and, secondly, split stop ring 8 which is split at 8'.

Figure 2:
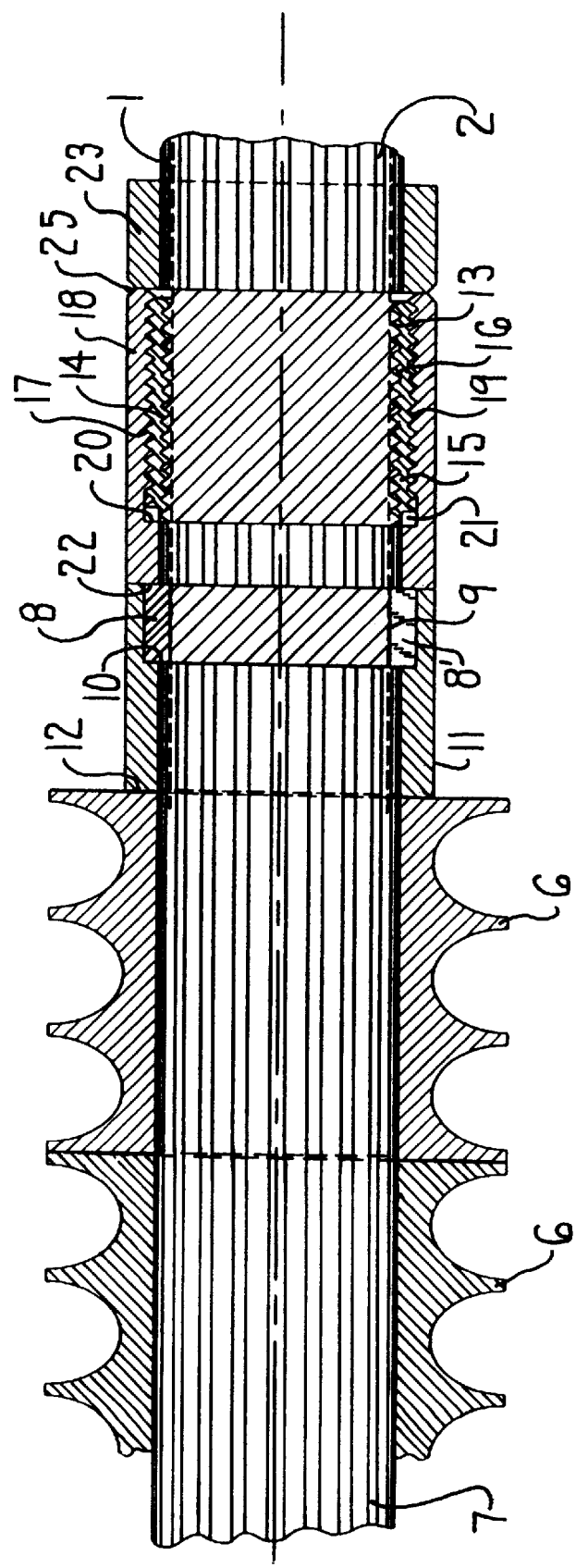
FIG. 2 shows a longitudinal section through part of the screw shaft according to FIG. 1 in an enlarged view.

Stop ring 8 is disposed according to FIG. 2 in ring groove 9 formed by a cut in shaft 1. The face of stop ring 8 closest screw elements 6 acts on the radial surface of annular inside shoulder 10 of sleeve-shaped intermediate ring 11 disposed in axially displaceable fashion on shaft 1. Annular inside shoulder 10 accordingly engages splining 7 on shaft 1. Ring shoulder 10 is formed by a radial inside recess in intermediate ring 11. With this inside recess intermediate ring 11 engages over stop ring 8. The adjacent screw element 6 lies closely against the face 12 of intermediate ring 11 spaced away from stop ring 8.

With shaft tip 3 formed as a screw bolt, screw elements 6 are prestressed against split stop ring 8 via intermediate ring 11.

To position stop ring 8 in the axial direction with a high accuracy of e.g. $\frac{1}{100}$ mm or more, second wider ring groove 13 is formed by a cut into shaft 1 on the section spaced away from screw elements 6 and spaced away first ring groove 9. The second ring groove 13 is provided with screw thread 14 extending over the total axial length of groove 13.

Split sleeve-shaped ring nut 15 is slipped with its internal thread 16 onto screw thread 14. Split ring nut 15 has an external thread 17 which protrudes radially beyond shaft 1. Ring nut 15 is formed shorter than thread 14 in ring groove 13 and can be screwed to this length.

Sleeve-shaped straining ring 18 provided with internal thread 19 is screwed onto ring nut 15 from the side of the screw elements.

To permit straining ring 18 to be screwed on, i.e. moved axially relative to ring nut 15, ring gap 21 is provided between ring shoulder 20 and ring nut 15.

Straining ring 18, which has an outside diameter corresponding to intermediate ring 11, is positioned with its face 22 directed towards screw elements 6 against the adjacent face of stop ring 8. Straining ring 18 is screwed against stop ring 8 with a defined torque. This permits stop ring 8 to be positioned very precisely in the axial direction, in all operating states.

In order to fix straining ring 18 after it has been screwed against stop ring 8 under defined conditions for its precise positioning, it must be connected with shaft 1 so as to rotate in unison. This is accomplished by disposing on the side of straining ring 18 facing away from screw elements 6 sleeve-shaped fastening ring 23 which is fastened to shaft 1 so as to rotate in unison, for example through splining 2 on shaft 1. Straining ring 18 is connected with fastening ring 23 so as to rotate in unison for example by welding 25, by soldering or by any other connection which is incorporated into the material or shape-mated.

Figure 3:
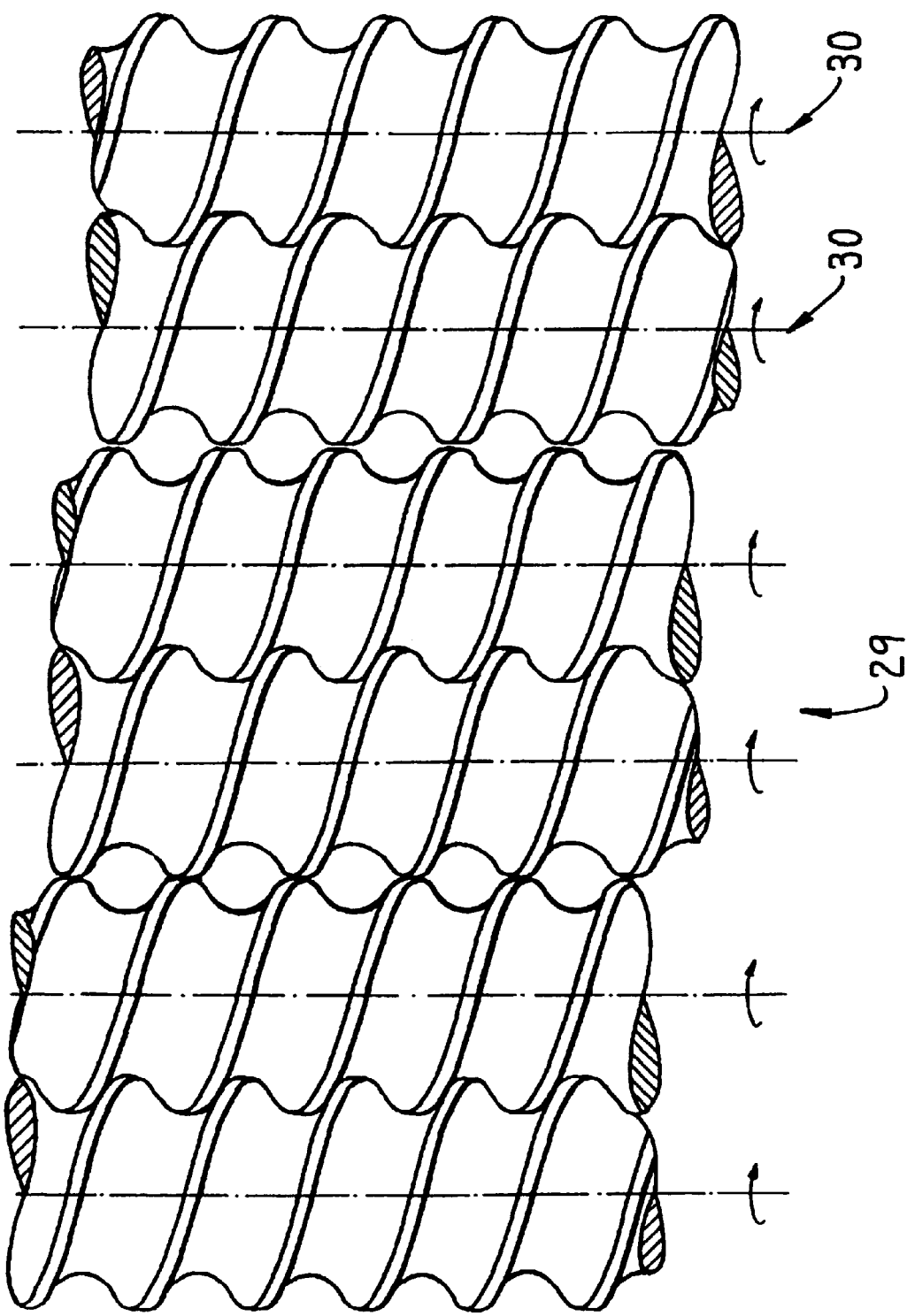
FIG. 3 depicts a multi-shaft screw-type machine of this invention.

FIG. 3 depicts a multi-shaft screw-type machine 29 of this invention. Machine 29 includes a number of parallel shaft assemblies 30. Each shaft assembly 30 includes a number of screw elements 6. The shaft assembly 30 are positioned so that the screw elements 6 intermesh.

What is claimed is:

1. A screw-type machine, said machine including:
    a plurality of shaft assemblies arranged in parallel, each said shaft assembly having at least one screw element and at least two said shaft assemblies arranged in close proximity so that said screw elements of said shaft assemblies intermesh and,
    wherein at least one of said shaft assemblies includes:
        an elongated shaft having opposed first and second ends, said shaft being shaped to have: a first circumferentially extending groove that is spaced from the second end; a second circumferentially extending groove that is located between the second end and the first circumferentially extending groove; and a screw thread located in the second circumferentially extending groove that extends circumferentially around said shaft;
        at least one said screw element fitted over said shaft between the first end of said shaft and the first circumferentially extending groove of said shaft to move along the length of said shaft and to rotate in unison with said shaft;
        a stop assembly fitted around said shaft and positioned against said screw element located closest to the first circumferentially extending groove of said shaft, said stop assembly including a stop ring fitted in the first circumferentially extending groove of said shaft, wherein movement of said stop assembly is limited by movement of said stop ring; and
        a straining ring fitted over the screw thread of said shaft and configured to engage the screw thread for longitudinal movement over said shaft and coupled to said shaft to rotate in unison with said shaft, said straining ring having a face directed towards said stop ring and positioned over said shaft so that the face abuts said stop ring.

2. The screw-type machine according to claim 1, wherein:
    a split ring nut is positioned between said straining ring and said shaft, said split ring nut having an internal screw thread and an external screw thread, the internal screw thread intermeshing with the screw thread of the shaft; and
    the straining ring has a internal screw thread that intermeshes with the external screw thread of said split ring nut.

3. The screw-type machine according to claim 1, further including:
    a fastening ring disposed on said shaft, said fastening ring being positioned to abut said straining ring to lock said straining ring to said shaft so that said straining ring rotates in unison with said shaft.

4. The screw-type machine according to claim 3, wherein said fastening ring is disposed between the second end of said shaft and said straining ring.

5. The screw-type machine according to claim 1, wherein said stop assembly includes an intermediate ring having an inside shoulder, said intermediate ring being situated between said stop ring and said screw element closest to the first circumferentially extending groove of said shaft and said stop ring abuts the inside shoulder of said intermediate ring.

* * * * *